(12) United States Patent
Watanabe et al.

(10) Patent No.: US 9,978,004 B2
(45) Date of Patent: May 22, 2018

(54) INFORMATION RECORDING MEDIUM, INFORMATION RECORDING METHOD, AND INFORMATION REPRODUCTION METHOD

(71) Applicant: HITACHI, LTD., Tokyo (JP)

(72) Inventors: Takao Watanabe, Tokyo (JP); Shigeki Mori, Tokyo (JP); Ryo Imai, Tokyo (JP); Koichi Watanabe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days. days.

(21) Appl. No.: 15/540,362

(22) PCT Filed: May 19, 2015

(86) PCT No.: PCT/JP2015/064353
§ 371 (c)(1),
(2) Date: Jun. 28, 2017

(87) PCT Pub. No.: WO2016/185566
PCT Pub. Date: Nov. 24, 2016

(65) Prior Publication Data
US 2017/0364778 A1 Dec. 21, 2017

(51) Int. Cl.
*B23K 26/53* (2014.01)
*G06K 15/12* (2006.01)
*G06K 1/12* (2006.01)
*B41M 3/00* (2006.01)
*G06K 15/02* (2006.01)

(52) U.S. Cl.
CPC .......... *G06K 15/1276* (2013.01); *B23K 26/53* (2015.10); *B41M 3/00* (2013.01);
(Continued)

(58) Field of Classification Search
CPC ... H04N 2201/047; H04N 2201/04729; H04N 2201/04753; H04N 2201/04786;
(Continued)

(56) References Cited

U.S. PATENT DOCUMENTS

2009/0316555 A1 12/2009 Yamazaki
2012/0092977 A1 4/2012 Sakamoto et al.
(Continued)

FOREIGN PATENT DOCUMENTS

JP 4143769 B2 9/2008
JP 2009-501398 A 1/2009
(Continued)

OTHER PUBLICATIONS

International Search Report of PCT/JP2015/064353 dated Aug. 4, 2015.
(Continued)

*Primary Examiner* — Kristal Feggins
(74) *Attorney, Agent, or Firm* — Mattingly & Malur, PC

(57) ABSTRACT

It is an object of the present invention to improve visibility for observation with naked eyes or for camera shooting without spoiling the appearance during marking inside a transparent medium using a laser. By irradiating an inside of a transparent medium with a laser, the present invention forms a micro-denatured region in each of a first layer and a second layer inside the medium. The micro-denatured regions in the respective layers are arranged out of alignment with each other on a two-dimensional plane (refer to FIG. 1).

15 Claims, 6 Drawing Sheets

(52) U.S. Cl.
CPC .......... *G06K 1/121* (2013.01); *G06K 15/023* (2013.01); *G06K 15/1271* (2013.01)

(58) Field of Classification Search
CPC .............. G06K 15/1276; G06K 15/023; G06K 15/1271; G06K 1/121; B23K 26/53; B41M 3/00
See application file for complete search history.

(56) References Cited

U.S. PATENT DOCUMENTS

| | | |
|---|---|---|
| 2012/0182851 A1 | 7/2012 | Saito et al. |
| 2015/0034723 A1 | 2/2015 | Watanabe et al. |
| 2015/0302883 A1 | 10/2015 | Watanabe et al. |

FOREIGN PATENT DOCUMENTS

| | | |
|---|---|---|
| JP | 2010-003357 A | 1/2010 |
| JP | 2011-81865 A | 4/2011 |
| JP | 4883567 B2 | 2/2012 |
| JP | 2012-089197 A | 5/2012 |
| JP | 2015-032331 A | 2/2015 |
| WO | 2006/101873 A2 | 9/2006 |
| WO | 2013/179329 A1 | 12/2013 |

OTHER PUBLICATIONS

Japanese Office Action received in corresponding Japanese Application No. 2017-518668 dated Feb. 13, 2018.

(a)

(b)

INFORMATION RECORDING MEDIUM, INFORMATION RECORDING METHOD, AND INFORMATION REPRODUCTION METHOD

TECHNICAL FIELD

The present invention relates to a technology for recording information to a medium.

BACKGROUND ART

The method for creating various patterns such as images, fonts, and two-dimensional barcodes on a surface of or inside a medium using laser is referred to as laser marking. Laser marking is divided into that for creation on a medium surface and that for creation inside a transparent medium such as glass. Lasers used for laser marking include nano-second lasers that output pulses with a pulse width of $10^{-9}$ second or more, pico-second lasers and femto-second lasers that output ultrashort pulses with a smaller pulse width, and so on. The following technology has been reported as an example of creation inside a transparent medium such as glass.

Patent Document 1 shown below discloses a technology for forming crack-shaped micro-denatured regions by concentrating a nano-second pulsed laser inside a medium having transparency to laser wavelengths. In the same document, the size of the micro-denatured regions is controlled by changing the number of pulses irradiated to record a grayscale image.

Patent Document 2 shown below discloses a method for preparing a plurality of layers in which a color caused by a color center or fine silver particle develops by irradiating glass with a femto-second laser and for changing a grayscale or hue by changing the number of stacked layers. Also, the document describes that there is a possibility that a full-color image can be expressed by using the method described in the same document (refer to paragraph 0032).

PRIOR ART DOCUMENTS

Patent Documents

Patent Document 1: Japanese Patent Publication No. 4143769
Patent Document 2: Japanese Patent Publication No. 4883567

SUMMARY OF THE INVENTION

Problem to be Solved by the Invention

The size and shape of micro-denatured regions formed during marking inside a transparent medium are different depending on a laser used. In general, nano-second lasers produce micro-cracks by thermal effects that accumulate in the vicinity of a focusing point. In contrast, pico-second lasers or femto-second lasers (hereinafter "ultrashort pulsed lasers") produce dot-shaped denatured regions (hereinafter denoted as "dots") having a more smooth shape rather than cracks. The denatured region here refers to a region having a higher refractive index state than a surrounding region due to a higher density caused by irradiation with laser beam or a region having a lower refractive index state than the surrounding region such as void hole. In quartz glass, the size of micro-cracks produced by a nano-second laser is approximately of the order of 100 μm. In contrast, if an ultrashort pulsed laser is used, dots having a diameter of the order of 1 to several μm are formed. Therefore, using an ultrashort pulsed laser allows for high-precision marking by fine dots. However, there is a problem of difficulty in achieving high contrast in the case of observation with naked eyes or shooting with a compact camera having a low magnification lens.

The cause of the above problem lies in that because dots produced by an ultrashort pulsed laser are not complicated in shape as with micro-cracks produced by a nano-second laser, the ratio of the area that scatters light is small. Reducing the dot pitch to increase a dot density so as to compensate for this leads to a possibility that the appearance of the marking may be spoiled due, for example, to contact between the dots.

The present invention has been devised in light of the foregoing, and it is an object of the invention to improve visibility for observation with naked eyes or for camera shooting without spoiling the appearance during marking inside a transparent medium using a laser.

Means for Solving the Problem

By irradiating an inside of a transparent medium with a laser, the present invention forms a micro-denatured region in each of a first layer and a second layer inside the medium. The micro-denatured regions in the respective layers are arranged out of alignment with each other on a two-dimensional plane.

Effect of the Invention

According to the present invention, it is possible to increase the number of dots per unit area when an information recording medium is observed from a normal direction. As a result, brightness per unit area increases. Therefore, it is possible to improve visibility.

MODES FOR CARRYING OUT THE INVENTION

Embodiments of the present invention will be described in detail below based on drawings. A normal direction of an information recording medium will be denoted below as Z direction, and a plane orthogonal to the Z direction will be denoted below as an XY plane. Also, a minimum tolerance of a dot center-to-dot center distance (pitch) in the same layer of an information recording medium will be denoted below as ΔP, and a depth of field of an observation means such as naked eyes or compact camera will be denoted below as ΔZ. The ΔP value may be different from one layer to another. However, no distinction will be made below between layers for easy understanding of the description, and it is assumed that ΔP is the same in all the layers.

<Embodiment 1>

Figure 1:
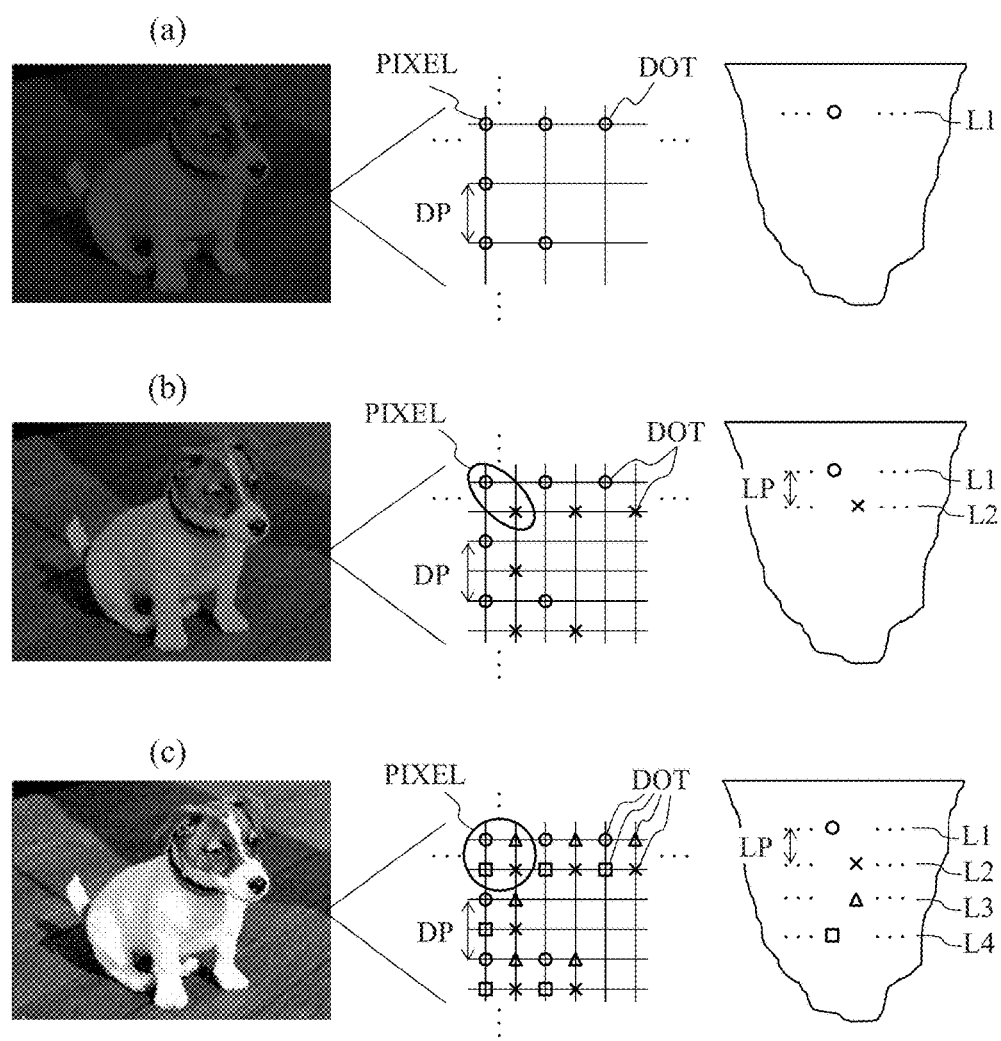
FIG. 1 is a diagram describing a configuration example of an information recording medium according to embodiment 1.

FIG. 1 is a diagram describing a configuration example of an information recording medium according to embodiment 1 of the present invention. A left column in FIG. 1 is a depiction of a surface of an information recording medium during observation from a normal direction. The information recording medium can record images and text. In FIG. 1, an example is shown in which a two-dimensional image is recorded. A middle column in FIG. 1 is an enlarged plan view describing an arrangement of micro-denatured regions formed in a layer inside an information recording medium. A right column in FIG. 1 is a side sectional view of the middle column in FIG. 1. Micro-denatured regions formed inside an information recording medium will be denoted below as "dots."

FIG. 1(a) illustrates an example in which an image is recorded by forming micro-denatured regions only in one layer (layer L1) inside an information recording medium for comparison. Each dot is formed such that the center thereof is arranged at a square lattice point defined on an XY plane. Here, it is assumed, for ease of description, that the shape and size of each dot are the same in each layer. However, the shape and size of each dot can be changed from one layer to another. A dot pitch DP is set to the same value for the same layer and is set to a larger value than the minimum tolerance ΔP.

FIG. 1(b) illustrates a configuration example of an information recording medium according to the present embodiment 1. In FIG. 1(b), the same dot pattern as in FIG. 1(a) is formed in the layer L1 and a layer L2, and dots are arranged out of alignment such that the dots do not overlap each other on the XY plane during observation of each dot from the Z direction. The group of dots shown as PIXEL in FIG. 1(b) corresponds to one dot in FIG. 1(a), and in FIG. 1(b), one dot in FIG. 1(a) is represented by two dots formed in the respective layers. Although the dot pitch DP in the respective layers is common, lattice points where dots are formed in the layer L1 are out of alignment with lattice points where dots are formed in the layer L2. This doubles the dot count per unit area as compared to FIG. 1(a). As a result, because the image becomes even brighter, the visibility is enhanced.

FIG. 1(c) illustrates a configuration example in which dots are formed in the layer L1 to a layer L4. Dots in the layer L1 are arranged at a lower right lattice point in the layer L2, at a rightwardly adjacent lattice point in the layer L3, and at a downwardly adjacent lattice point in the layer L4. This quadruples the dot count per unit area as compared to FIG. 1(a). Because the image becomes even brighter, the visibility is further enhanced, If the value of the dot pitch DP is set so as not to fall such that the dot pitch DP value does not fall below the minimum tolerance ΔP and is set to such an extent that adjacent dots are not seen as separate in consideration of a resolution of an observation means (e.g., naked eyes, compact camera), it is less likely to give an impression of rough lookingness to make it look more beautiful during observation.

In FIG. 1(b) and FIG. 1(c), an interlayer dot pitch LP in the Z direction is set such that a distance from the frontmost layer to the backmost layer as seen :from the Z direction falls within the depth of field ΔZ of the observation means. As a result, it can be seen in proper focus in all the layers. Therefore, it is possible to increase the brightness per unit area almost proportionally with the number of layers.

It is desirable to set the dot pitch DP (and the minimum tolerance ΔP) such that the dots do not overlap each other as observed from the Z direction. Specifically, it is desirable to set the dot pitch DP (and the minimum tolerance ΔP) such that the following conditions are satisfied.

(Condition 1)

Set the dot pitch DP in a layer such that the dots do not overlap each other in the layer, (Condition 2)

Set the dot pitch DP in each layer to a distance or more that ensures that when the dots in each layer are projected onto the same layer, none of the dots overlap.

(Condition 3)

The above condition 1 and condition 2 are true in each of the layers.

In FIG. 1, the lattice points where the dots are formed are moved in each layer such that the dots do not overlap each other as observed from the Z direction. However, even if the dots are arranged such that they overlap as seen from the Z direction, the apparent brightness of the dots is enhanced. For this reason, the visibility improves to a certain degree. Therefore, if it is difficult to control positions where the dots are formed with high precision, the dots may be formed at the same lattice points on the XY plane in one of the layers.

<Embodiment 1: Conclusion>

As described above, according to the information recording medium according to the present embodiment 1, it is possible to increase the dot count per unit area as seen from the Z direction by forming the same dot pattern on a plurality of layers. This makes it possible to obtain sufficient brightness during representation of a grayscale image even in laser marking that uses an ultrashort laser that often leads to a small dot diameter as compared to a dot pitch, allowing for highly visible marking.

<Embodiment 2>

In embodiment 1, the dot pattern formed in each layer is the same except that coordinates on the XY plane are out of alignment with each other. In embodiment 2 of the present invention, a description will be given of a configuration example in which the dot pattern recorded in each layer is different.

Figure 2:
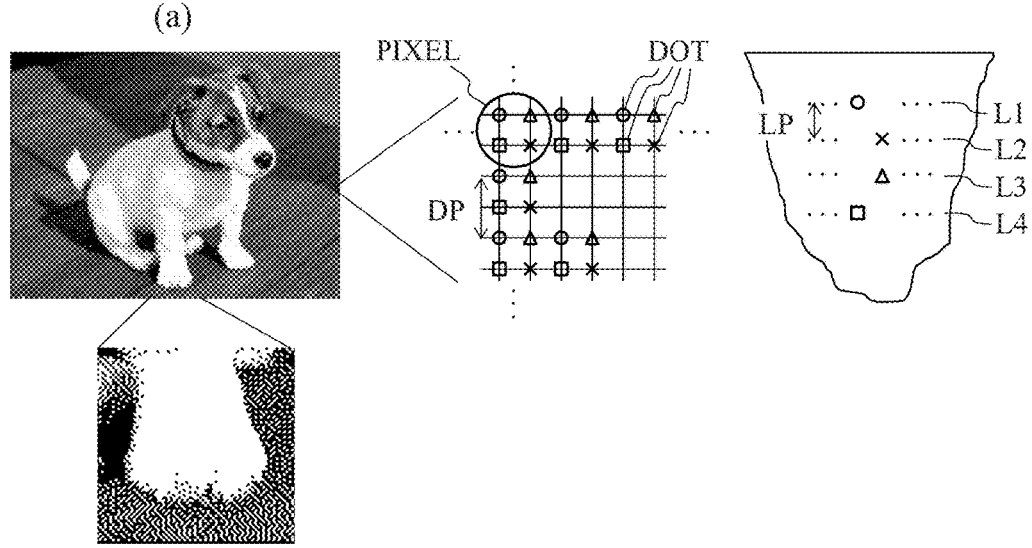
FIG. 2 is a diagram describing a configuration example of an information recording medium according to embodiment 2.
Figure 2:
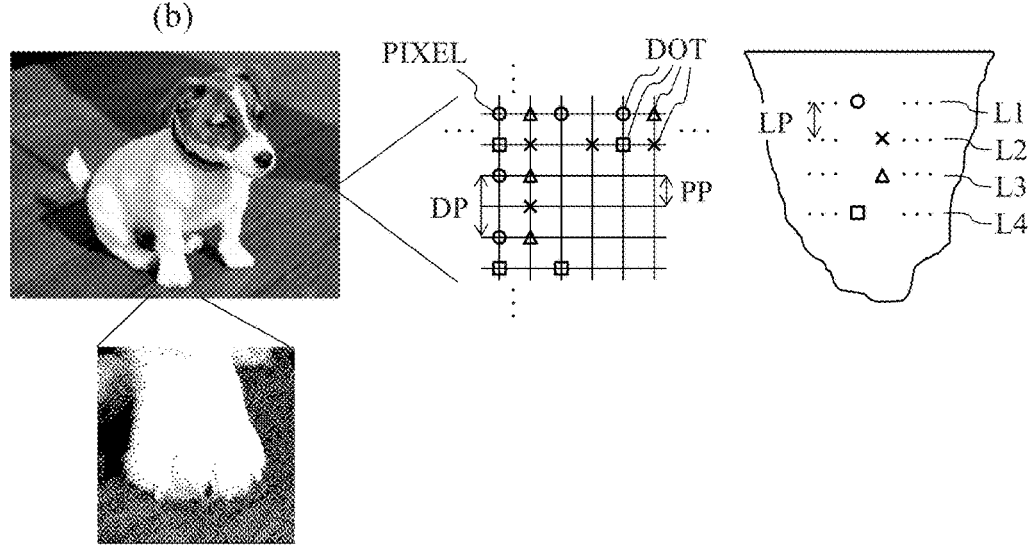

FIG. 2 is a diagram describing a configuration example of an information recording medium according to embodiment 2. FIG. 2(a) illustrates FIG. 1(c) again for comparison. FIG. 2(b) illustrates a dot pattern of the information recording medium according to the present embodiment 2. In FIG. 2(a) and FIG. 2(b), the number of layers is the same. Therefore, the image brightness is approximately the same in densely-patterned dot portions.

In FIG. 2(b), for example, different lattice points on the image are sampled for each layer, and the sampled lattice points are assigned to respective different layers. In embodiment 1, the dot pattern in each layer is the same. In contrast, in the present embodiment 2, each layer has a different dot pattern. Therefore, an amount of information per unit area increases, and a spatial frequency as Observed from the Z direction is enhanced. This allows for reproduction of details of the image. The enlarged view in the left column of FIG. 2 clearly shows this. Therefore, the information recording medium according to the present embodiment 2 is suitable for recording high-definition grayscale images.

In the information recording medium according to the present embodiment 2, the amount of information per unit area recorded in the information recording medium (i.e., image spatial frequency) is improved by forming a different dot pattern for each layer, and it is possible to record more finely detailed images. For example, although it is simple and easy to assign adjacent dots sequentially to each layer in accordance with the order of arrangement, the sequence of sampling the lattice points assigned to each layer is not limited thereto. As long as the dot pattern in at least any of the layers is different from the dot pattern in the other layers, it is possible to produce the same effect as in the present embodiment 2.

<Embodiment 3>

In embodiment 1 and embodiment 2, a configuration example is described in which a grayscale image is formed by micro-denatured regions (dots) that reflect light. It is not necessarily required for image pixels and dots to have a one-to-one correspondence, and one pixel may be formed by a plurality of dots. In the present embodiment 3, a configuration example will he described in which a plurality of dots are formed in a pixel of a grayscale image and information is encoded by that dot pattern. The method itself by which to record information to the information recording medium is the same as in embodiment 1 and embodiment 2.

Figure 3:
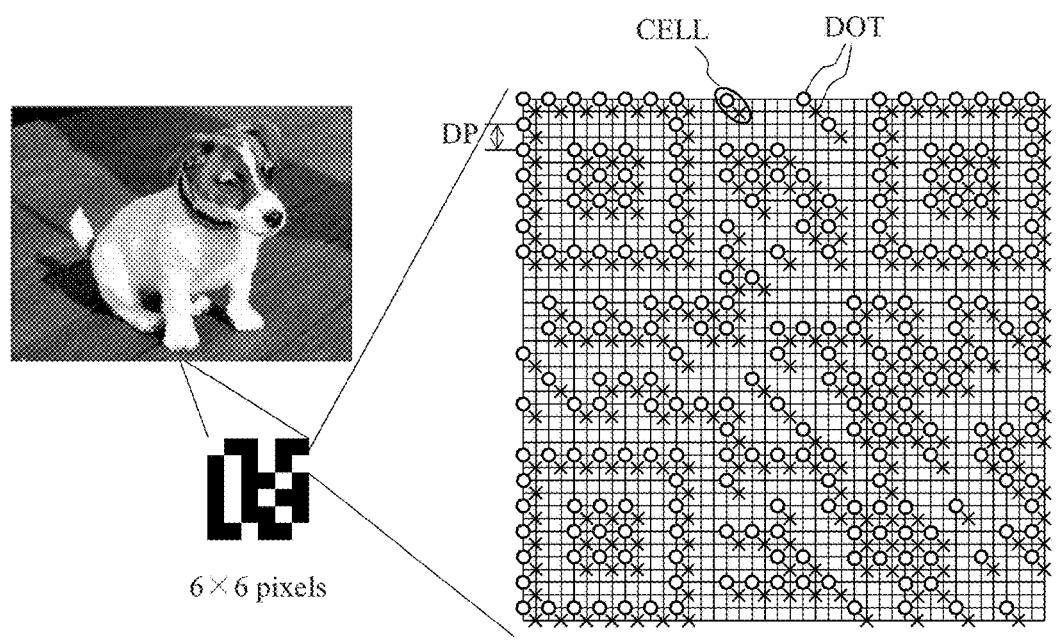
FIG. 3 is a diagram describing a configuration example of an information recording medium according to embodiment 3.
Figure 3:
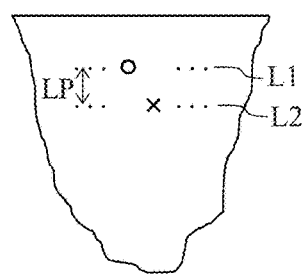

FIG. 3 is a diagram describing a configuration example of the information recording medium according to embodiment 3. In FIG. 3, digital data is recorded inside a pixel that makes up a grayscale image. A two-dimensional barcode made up of a plurality of dots is formed inside a white pixel that makes up a grayscale image. In the example illustrated in FIG. 3, 6×6 pixels are shown by enlarging a lower portion of the image, and a two-dimensional barcode is formed by a dot pattern by enlarging a white pixel of the 6×6 pixels.

The information recording medium shown in FIG. 3 looks like a grayscale image when observed by naked eyes or by a low-magnification lens. When shot with a camera having a high-magnification lens, however, two-dimensional barcodes formed in the individual pixels can be read. A two-dimensional barcode can record digital data such as numbers, text, and binary code. As is well known, a two-dimensional barcode has an arrangement of white or black rectangles in units called cells. In the present embodiment 3, one white pixel is made up of two dots of the layer L1 and the layer L2. In FIG. 3, the portion shown as "CELL" is a white cell.

In FIG. 3, the lattice points where the dots are arranged are moved diagonally as seen from the Z direction as in FIG. 1(b). Therefore, because white cells look brighter as compared to when dots are formed only in one layer, contrast between white cells and black cells is enhanced during shooting of the two-dimensional barcode with a camera. This makes it possible to reduce read errors.

Although a case of two layers is shown for easy description, it is a matter of course that three or more layers may be used to make up a white cell in the same manner if even brighter white cells are desired. For example, it is possible to make white cells even brighter by using four layers as in FIG. 1(c).

The information recording medium according to the present embodiment 3 can not only simply record a grayscale image but also record digital information therein. Therefore, the information recording medium has an advantage in that more information can be recorded. For example, when photographic data is recorded to the information recording medium, the information recording medium can record color photographic data prior to conversion into a monochrome image and an explanatory note thereof using a digital format that permits handling of color data in addition to a monochrome grayscale image into which the photographic data has been converted. If not only a grayscale image but also text and so on are marked as a font so that they can be recognized with naked eyes, it is possible to judge at first glance the recorded target, recording method, coding scheme, and so on by looking at it. Further, if the two-dimensional barcode is decoded by enlarging the pixel as necessary, it is possible to read detailed recording such as color data and a detailed explanatory note.

If there is a margin in the recording area, a grayscale image and digital data (e.g., two-dimensional barcode) may be recorded in different regions on the XY plane. In that case, the digital data may be rendered decodable with a camera having a low-magnification lens (e.g., camera incorporated in a smartphone) by increasing the number of dots included in one cell of the two-dimensional barcode and increasing the cell size. This makes it possible to reproduce digital data in a simple and easy manner.

If a two-dimensional barcode is recorded to a different region from that of a grayscale image, it is possible to arrange a plurality of two-dimensional barcodes with a spacing therebetween inside a rectangular region. In that case, setting an aspect ratio of a rectangular portion dose to an aspect ratio of a common image capturing element is convenient because the plurality of two-dimensional barcodes can be captured all together within a field of view.

The amount of information that can be recorded in one two-dimensional barcode is limited. Therefore, when large-capacity digital data such as color image is recorded, a necessity arises to divide one piece of information into a plurality of two-dimensional barcodes and record them. A description will be given below of a method by which to divide large-capacity digital data into a plurality of two-dimensional barcodes and record them and by which to decode the two-dimensional barcodes.

Although there are various types of two-dimensional barcodes, many thereof can handle alphanumeric characters and common symbols. For this reason, when digital data is divided and recorded, original digital data is encoded, for example, by alphanumeric characters, and a header using an appropriate symbol is attached, and the data is divided into a plurality of two-dimensional barcodes. A specific procedure is described below.

First, a character string is created by converting original binary data into a hexadecimal number from 00 to FF on an eight-bit-by-eight-bit basis (encoding). Next, the character string is divided into shorter character strings such that the character strings can be recorded to individual barcodes. A header indicating divided digital data is added as a character string to the beginning of the divided character strings. Header identification character strings (e.g., %%, $) indicating the beginning and the end of the header are attached to the header. (a) digital data identifier before division, (b) number of divisions, (c) character string indicating what number two-dimensional barcode the two-dimensional barcode concerned is, and so on can be included between header identification character strings. Header identification character strings function as a means of distinguishing between a data portion held by the two-dimensional barcode concerned and a header portion. By reading header identification character strings and information included in the header, it is possible to connect the divided pieces of information and correctly reproduce original digital data.

The above header is convenient for recording digital data using a plurality of two-dimensional barcodes. Particularly in the present embodiment 3, however, the pixel arrangement is different depending on the image. Therefore, it is important as described above to be able to identify the digital data identifier and what number two-dimensional barcode it is.

For example, "$JPEG 001/023 picture1 BASE16 0041: 1066$" and so on can be used as the above header. $ is the header identification character string and indicates that the header is between $ and $. "JPEG" indicates that the file format of the recorded image is JPEG. "001/023" indicates that there are 23 two-dimensional barcodes in total, and that the one with this header is the first thereof. "picture1" is the identifier of the recorded digital data. "BASE16" indicates the encoding scheme (method that uses a character string from 00 to FF that corresponds to a hexadecimal number). "0041:1066" indicates that the 41st to 1066th characters from $ in the beginning is the character string that corresponds to the data.

<Embodiment 3: Conclusion>

As described above, the information recording medium according to the present embodiment 3 records digital data hierarchically using part of the portion that can be read in an 'as-is' manner with naked eyes. This has an advantage in that the recording area of the medium on the XY plane can be reduced.

The information recording media described in embodiment 1 and embodiment 2 can secure sufficient dot pattern brightness even in the case of laser marking using an ultrashort pulsed laser. Therefore, even if digital data such as the two-dimensional barcode is marked at high density as described in the present embodiment 3, it is possible to reduce read errors. Using an ultrashort pulsed laser allows for formation of dots inside not only ordinary glass but also difficult-to-process materials such as ceramics, quartz glass, sapphire, and diamond without producing cracks. According to the present invention, therefore, it is possible to record high-definition images and high-density digital data inside a wide variety of types of media and is possible to Observe them clearly.

<Embodiment 4>

In the above embodiment 1 to embodiment 3, an image to be recorded to an information recording medium is converted into a monochrome image with two gradations and recorded as a grayscale image. At this time, error diffusion method used for printing technology and so on can be used to smooth the gradations to the extent possible. In embodiment 4 of the present invention, a description will be given of a specific procedure for recording an image using error diffusion method.

Figure 4:
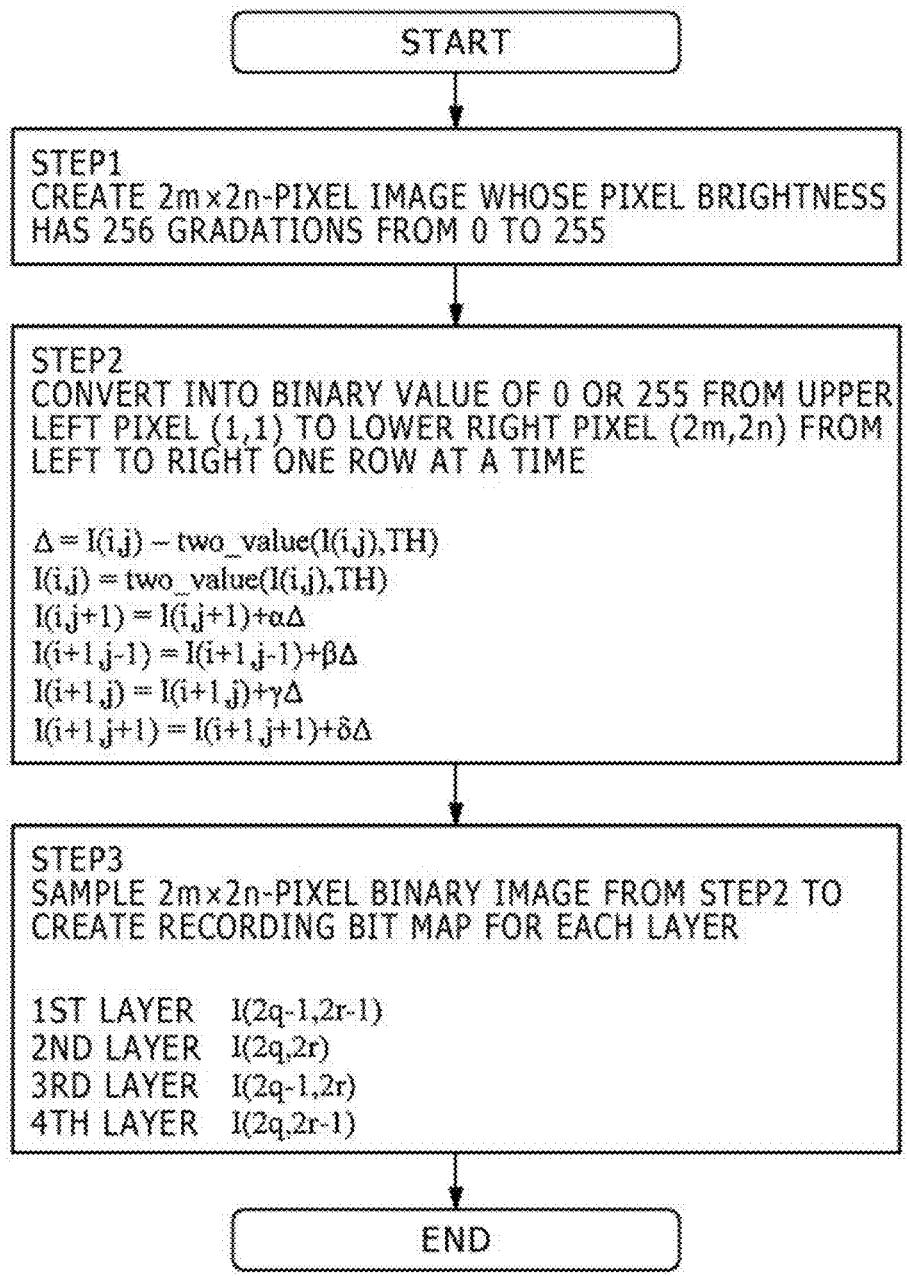
FIG. 4 is a flowchart describing a procedure for calculating a dot arrangement during recording of an image to an information recording medium.

FIG. 4 is a flowchart describing a procedure for calculating a dot arrangement during recording of an image to the information recording medium described in embodiment 1 to embodiment 3. An example is shown here in which dots are recorded to four layers as an image to be recorded using a monochrome image sized at 2m×2n pixels each of which has 256 gradations.

(FIG. 4: STEP1)

A user reads desired image data to be recorded to the information recording medium using, for example, a computer. The computer creates, from the image data, a 2m×2n-pixel image whose pixel brightness has 256 gradations from 0 to 255. m and n are positive integers and set to appropriate values based on the recording region and the dot pitch on the information recording medium such that 2m×2n does not exceed the number of recordable dots. An arbitrary known technology can be used as a method by which a computer adjusts the image size and gradations. Therefore, no particular mention is made here.

(FIG. 4: STEP2)

The computer converts the 2m×2n pixels having 256 gradations created in STEP1 into 2m×2n pixels having two gradations of white (brightness 255) or black (brightness 0). If simply the pixels whose gradation value is from 0 to 127 are converted into black, and the pixels whose gradation value is 128 or above are converted into white, it is impossible to reproduce the smooth variation of gradations in the original image. To generate a monochrome image while maintaining the gradations of the original image, a calculation method called the Steinberg method among the methods called error diffusion methods is used in the present embodiment 4.

(FIG. 4: STEP2: Calculation Formulas)

The coordinates of each of the 2m×2n pixels are represented by XY coordinates (i,j). i represents the ith row, and j represents the jth column. The computer converts the pixel brightness into a binary value from the upper left pixel (1,1) to the lower right pixel (2m,2n) from left to right one row at a time in accordance with error diffusion method. The calculation formulas of error diffusion method can be expressed as follows:

$$\Delta = I(i,j) - \text{two\_value}(I(i,j), TH) \quad \text{(Formula 1)}$$

$$I(i,j) = \text{two\_value}(I(i,j), TH) \quad \text{(Formula 2)}$$

$$I(i,j+1) = I(i,j+1) + \alpha\Delta \quad \text{(Formula 3)}$$

$$I(i+1,j-1) = I(i+1,j-1) + \beta\Delta \quad \text{(Formula 4)}$$

$$I(i+1,j) = I(i+1,j) + \gamma\Delta \quad \text{(Formula 5)}$$

$$I(i+1,j+1) = I(i+1,j+1) + \delta\Delta \quad \text{(Formula 6)}$$

$I(i,j)$ represents the brightness of the pixel $(i,j)$. $I(i,j+1)$ represents the brightness of the pixel rightwardly adjacent to the pixel $(i,j)$. $I(i+1,j-1)$ represents the brightness of the pixel disposed leftwardly and downwardly from the pixel $(i,j)$. $I(i+1,j)$ represents the brightness of the pixel downwardly adjacent to the pixel $(i,j)$. $I(i+1,j+1)$ represents the brightness of the pixel disposed rightwardly and downwardly from the pixel $(i,j)$. two_value$(I(i,j),TH)$ is a binarization function, and two_value$(I(i,j),TH)$ is 255 when the value of $I(i,j)$ is equal to TH or more, and two_value$(I(i,j),TH)$ is 0 when the value of $I(i,j)$ is less than TH. $\Delta$ is the difference resulting from subtracting the brightness after binarization from the original pixel brightness and corresponds to the error caused by binarization. $\alpha$, $\beta$, $\gamma$, and $\delta$ are coefficients whose sum is 1. A threshold TH and the coefficients are parameters and need only be optimized depending on the image. For example, TH is set to 255, and $\alpha$, $\beta$, $\gamma$, and $\delta$ are set to 7/16, 3/16, 5/16, and 1/16, respectively.

(FIG. 4: STEP2: Supplement)

In the present step, because a coordinate overflow occurs at only one pixel at the most peripheral portion of the image, it is impossible to calculate the gradation value of the most peripheral portion. For this reason, for example, the computer may enlarge the original image to (2m+1)×(2n+2) pixels in advance by interpolation and cut out only 2m×2n pixels excluding the most peripheral portion after completion of calculations for the 2m×2n pixels. Interpolation may be performed using the 2m×2n pixels as a whole. Alternatively, the pixel brightness of the most peripheral portion may be copied in an 'as-is' manner to the outside. Still alternatively, other appropriate method may be used.

(FIG. 4: STEP3)

The computer samples the 2m×2n pixel values created in STEP2 to create a bit map for recording to each layer. The pixels to be sampled will be described below. q and r shown below are an integer from 1 to m and an integer from 1 to n, respectively, and I represents the pixel brightness. The brightness I has been binarized in STEP2 and is, therefore, 0 or 255. The computer samples I(2q−1,2r−1) for the first layer, samples I(2q,2r) for the second layer, samples I(2q−1,2r) for the third layer, and samples I(2q,2r−1) for the fourth layer from the original image. By sampling a pixel at a different position for each layer, it is possible to arrange the 2m×2n pixels in the four layers without overlaps. A laser marking apparatus forms dots at the layers/coordinates having a brightness of 255 by laser marking.

<Embodiment 4: Conclusion>

When the dots formed by four layers by the above process arc seen from the Z direction, the monochrome image created by error diffusion method in STEP2 is reproduced. The dot pitch of the four layers combined is half the pitch of each layer. As described in FIG. 2, the brightness per unit area is brighter than in the case of one layer, and further, the spatial frequency is higher. Therefore, high-definition images can be recorded, In the present embodiment 4. it is assumed that four layers are arranged as in FIG. 2(b). However, even if other dot arrangement is used, it is possible to calculate the dot arrangement in the same manner as in FIG. 4. Technical experts having knowledge about image processing can readily change the number of layers, the number of gradations, and the aspect ratio of the image. Therefore, a detailed description of such modifications will be omitted. If the original image is a color image, R(red), G(green), and B(blue) data may be added at an appropriate ratio in STEP1 and then, it may be converted into a monochrome 256 gradations.

<Embodiment 5>

Figure 5:
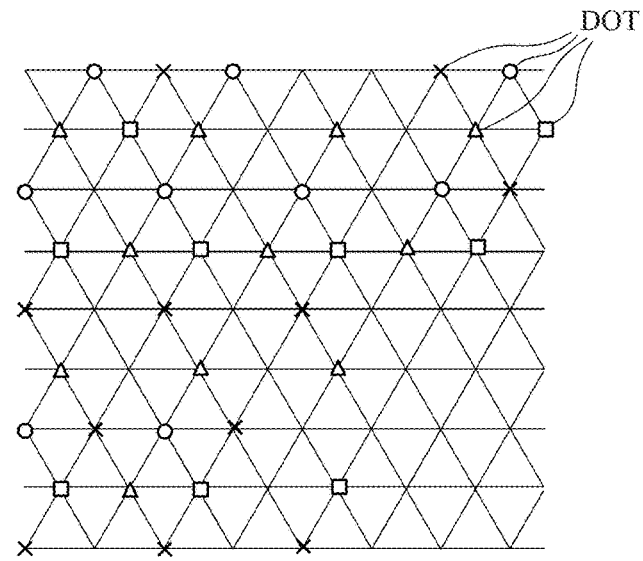
FIG. 5 is a plan view illustrating a dot arrangement in an information recording medium according to embodiment 5.

FIG. 5 is a plan view illustrating a dot arrangement in an information recording medium according to embodiment 5 of the present invention. In the present embodiment 5, dots are arranged at equilateral triangular lattice points rather than at square lattice points. As for other matters, embodiment 5 is the same as embodiment 1 to embodiment 4. This makes it possible to improve the dot density while at the same time maintaining the distance between adjacent dots constant in each layer.

If the length of one side is the same, the area of the equilateral triangle is $3^{0.5}/4$ when the area of the square is 1. As for squares, however, vertices are shared by four squares. Therefore, if dots are arranged at all the four vertices, one dot is assigned for each square. In contrast, as for equilateral triangles, vertices are shared by six equilateral triangles. Therefore, if dots are arranged at all the three vertices, a half dot is assigned for each equilateral triangle. Therefore, the dot density in equilateral triangular arrangement improves $2/3^{0.5}$-fold relative to square arrangement. That is, according to the present embodiment 5, it is possible to make the image 15.5% brighter than in the case of FIG. 2(b). About 4.6-fold brightness is obtained. as compared to the case of one layer in FIG. 1(a). Note that the distance between adjacent dots in each layer in FIG. 5 is the same as in FIG. 1 and FIG. 2. Although an example of four layers is shown in FIG. 5, it is also possible to increase the dot density more than in square arrangement even in the case of other numbers of layers.

The methods by which to record a grayscale image using a plurality of layers is described in the above embodiments. Grayscale image recording is not limited to the above embodiments, and numerous variations are possible. For example, one possibility is to record a recording-purpose image, created by error diffusion method after adjusting the density of an image to be recorded through low-pass filtering, to a layer in the back of the layer in which a grayscale image is recorded. Thanks to this, although depending on the image, it is expected that the image background will look smooth so that the image can be observed beautifully. Alternatively, another possibility is to reverse the white and black of the above low-pass-filtered image first, adjust the density to an appropriate value, and then record. In this case, there is efficacy in reducing low spatial frequency components of the image. Therefore, it is expected that high frequency components of the recorded image will be highlighted and look sharp.

In the above embodiments, it is described that a plurality of layers are provided within the depth of field of the observation means such as naked eyes or compact camera. In general, the depth of field refers to the range where it can be seen in focus. In the case of a camera, the depth of field can be reduced by opening the aperture, and the depth of field can be increased by closing the aperture. For example, supposing that the lens focal distance is set to 50 mm, the distance to the subject is set to 100 mm assuming closeup photography, and the permissible circle of confusion diameter is set to 0.03 mm (30 μm), a common value, then when an aperture F is 2, the depth of field is about 0.4 mm (400 μm), and when the aperture F is 8, the depth of field is 2 mm. In the case of naked eyes, the depth of field is adjusted by intracerebral processing. Therefore, although quantitative quantification is difficult, there is no problem with ordinary observation as long as the depth of field is, for example, 1 mm or less.

It is necessary to keep in mind that when layers are provided within the depth of field, the recording regions in the back layers look smaller than the recording regions in the front layers. Letting the distance in the Z direction from the naked eyes or camera to the closest layer be denoted by L, letting the distance from that layer to the backmost layer be denoted by ΔL, and letting the distance from the center of the recording region to the end of the recording region be denoted by R, the misalignment at the end of the recording region is about R·ΔL/L. Setting ΔL such that this amount is smaller than the resolution of the observation means, it is possible to keep the misalignment due to difference in apparent size to a level with no practical problems. For example, if L is set to 200 mm, ΔL is set to 400 μm, and R is set to 25 mm, the above value is 50 μm, and it is impossible to distinguish with naked eyes. It should be noted that when L is set to 200 mm, the naked eye resolution is about 58 μm for a person having visual acuity of 1.0 (20/20 vision). In this case, it suffices that ΔL, is set to be 400 μm or less.

<Embodiment 6>

Figure 6:
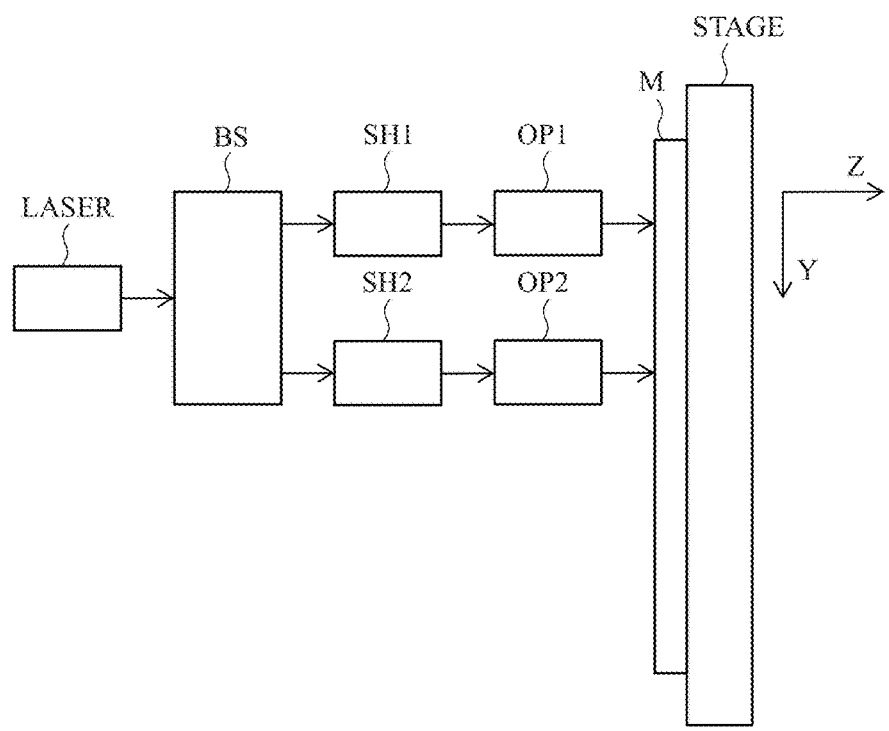
FIG. 6 is a configuration diagram of a laser marking apparatus for manufacturing information recording media.

FIG. 6 is a configuration diagram of a laser marking apparatus for manufacturing the information recording medium described in embodiment 1 to embodiment 5. The present apparatus can record dots of a plurality of layers in parallel. A laser apparatus LASER outputs a pulse-shaped laser beam for recording dots inside an information recording medium M. A beam splitter BS is an optical component that splits the output laser beam into two. An optics OP1 and an optics OP2 concentrate the split laser beams inside the information recording medium M. A shutter SH1 and a shutter SH2 are components that adjust the timing for irradiation with the laser beams.

A pulsed beam emitted from the laser apparatus LASER is split into two by the beam splitter BS and enters the optics OP1 and the optics OP2. The optics OP1 and the optics OP2 are adjusted such that the respective pulsed beams that have transmitted through the optics OP1 and the optics OP2 are concentrated in different layers inside the information recording medium M. For example, if the dot pattern described in FIG. 1(b) is recorded, the dots of the layer L1 are formed by the optics OP1, and the dots of the layer L2 are formed by the optics OP2.

In the dot arrangement described in FIG. 1(b), the respective dot positions on the XY plane do not overlap as seen from the Z direction. Therefore, recording is complete by forming the dot pattern while at the same time raster-scanning the recording region. Whether to form dots at the lattice points can be selected by controlling the transmission or interruption of the pulsed beams by the shutter SH1 and the shutter SH2.

The positions (depths) in the Z direction where the optics OP1 and the optics OP2 concentrate the laser beams are preferably within the assumed depth of field of the observation means. The assumed value of the depth of field may be stored, for example, in the storage device of the computer that controls the laser marking apparatus in advance and control each member such that the laser beams are concentrated within the range of the value.

To form the two-dimensional barcode described in embodiment 3, the computer may be implemented a function to enlarge the original image on the screen of the computer that controls the laser marking apparatus and specify pixels and a two-dimensional barcode to be recorded inside the pixels. The user specifies the two-dimensional barcode and the pixels that record the barcode using the computer, and the laser marking apparatus records the two-dimensional barcode that makes up the pixels in accordance with the specification.

<Embodiment 6: Conclusion>

As described above, the laser marking apparatus according to the present embodiment 6 records dots of two layers in parallel using two laser beams. Therefore, it is possible to reduce the recording time as compared to recording with a single beam. Although a case is described in the present embodiment 6 in which two layers are recorded at the same time, it is a matter of course that the number of laser beams split may be increased such that three or more layers can be recorded simultaneously if the laser pulse energy is sufficiently high.

In the present embodiment 6, it is not necessarily required to fix the correlation between the positions where recording is performed by the optics OP1 and the positions where recording is performed by the optics OP2. That is, the optics OP1 and the optics OP2 may concentrate the laser beams at independent positions. Alternatively, recording may be performed in parallel at different positions in the same layer rather than in different layers.

It should be noted that if the number of necessary recording layers is larger than the number of layers where parallel recording is performed, recording is preferably performed in sequence starting from the backmost layer. This ensures that the dots recorded earlier are not adversely affected.

<Embodiment 7>

Figure 7:
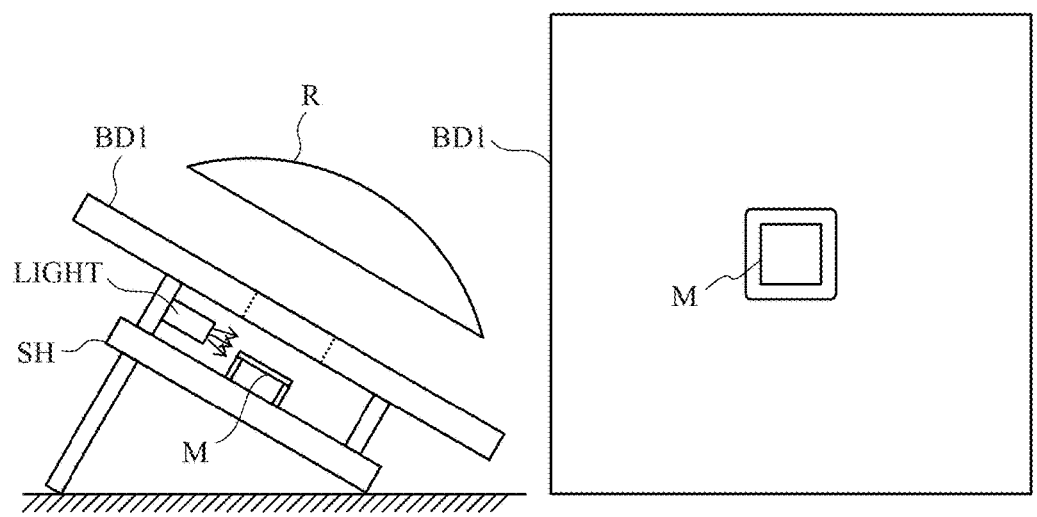
FIG. 7 is a side view and a top view illustrating a configuration of an observation device for observing an information recording medium M.

FIG. 7 is a side view and a top view illustrating a configuration of an observation device for observing the information recording medium M described in embodiment 1 to embodiment 5. A legged holder SH is configured such that the present observation device can be placed in a tilted position on a desk and so on. This allows an observer to observe the information recording medium in a comfortable posture. As illustrated in FIG. 7, the information recording medium M is fastened in a manner slightly floating from the legged holder SH. A tight-shielding plate BD1 prevents externally entering stray light from being reflected by a surface of the information recording medium M and reducing contrast of the image of the dots recorded. A light LIGHT irradiates light onto the information recording medium M described in embodiment 1 to embodiment 5. A loupe R is used to magnify the information recording medium M illuminated by the light LIGHT for observation. If the image recorded on the information recording medium M is large enough, the information recording medium M may be observed directly with naked eyes rather than using the loupe R.

The light LIGHT illuminates the information recording medium M almost from a lateral direction. This ensures that light irradiated from the light LIGHT is not reflected by the surface of the information recording medium M and does not enter the naked eyes. Therefore, the portion where no dots are recorded, i.e., the background, looks dark. On the other hand, light that strikes the dots is scattered by the dots, and part of light enters the naked eyes. As a result, the image formed by the dots recorded looks bright and stands out. By adjusting a repetition frequency of the ultrashort pulsed laser, a pulse energy, and a pulse count used during marking, it is possible to adjust a dot modification state. For example, it is possible to (a) produce a higher refractive index state than in the surrounding region or (b) produce a void hole. Although the image can be viewed brightly even in the denaturation state of (a) by scattering illumination light, the denaturation state of (b) in particular is suitable for image observation applications because total reflection occurs on the dot surface to make the image shine brighter.

According to an experiment conducted by the present inventor, when an approximate depth of 300 μm from the surface of an information recording medium formed using quartz glass was irradiated with a pulse having a 780 nm wavelength, having a 76 MHz repetition frequency, having a 190 fs pulse width, and having a 25 nJ pulse energy that had been concentrated by a lens having an aperture ratio of 0.85 for a duration of 500 μs, a dot having a void hole structure of approximately 4 μm or so in diameter was formed. When the dot was illuminated by LED light from the lateral direction, the portion about 1.4 μm in diameter of the dot surface looked bright and shiny. Also, recording was successfully performed at a dot pitch of 2.5 μm using a laser whose energy had been increased by reducing the repetition frequency to 1 kHz. In this case, details of the internal dot structure are unknown because of the small dot diameter. However, when light was irradiated in the same manner as in FIG. 7, the dot portion looked bright.

The parameters such as laser irradiation conditions described in embodiment 6 and embodiment 7 are not limited to the above and may he selected as appropriate in accordance with the required dot size and the internal dot structure.

In embodiment 7, even if indoor light alone is insufficient for observation, it is possible to observe the image clearly with the light LIGHT. Also, because the dot density as seen from the observation direction can be increased by the above embodiment 1, embodiment 2, embodiment 3, embodiment 5, and so on, it is no longer necessary to increase illuminance more than necessary. This leads to reduced power consumption during exhibition of the information recording medium M. Further, because the light LIGHT irradiates the information recording medium M approximately from the lateral direction, it is possible to keep to a minimum a risk that the light LIGHT may directly enter the eyes and cause injury.

<Embodiment 8>

Figure 8:
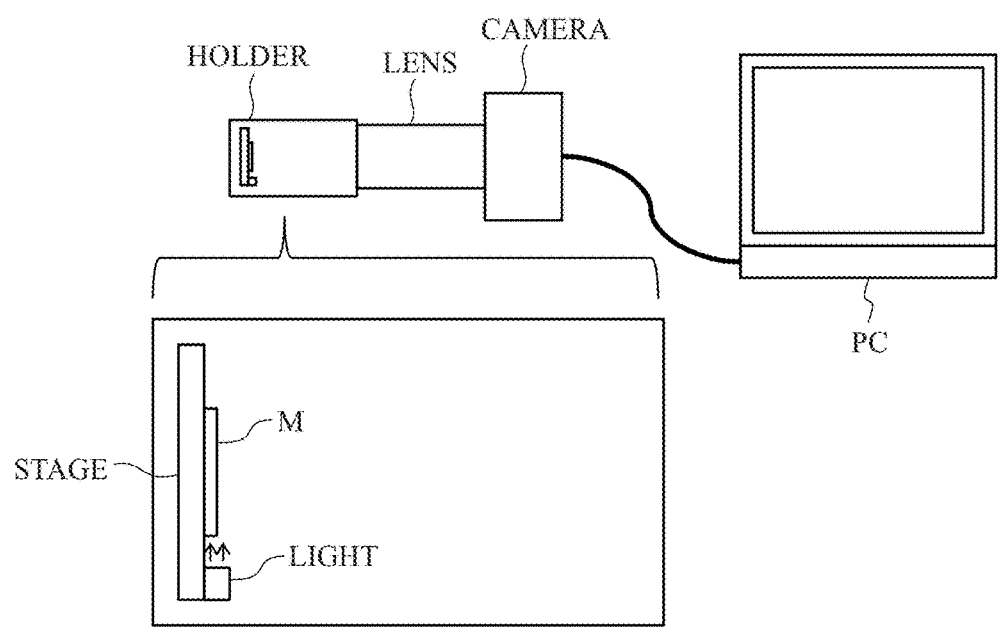
FIG. 8 is a side view illustrating a configuration of an image capturing device for capturing the information recording medium M.

FIG. 8 is a side view illustrating a configuration of an image capturing device for capturing the information recording medium M described in embodiment 1 to embodiment 5. A camera CAMERA is a camera body incorporating an image capturing element. A LENS is a lens capable of closeup photography. A camera mounting holder HOLDER is a holder for fastening the information recording medium M and mounting the information recording medium M to the lens LENS. The camera mounting holder HOLDER incorporates the light LIGHT. The information recording medium M is fastened on a stage STAGE that adjusts a relative position with respect to the lens LENS. The stage STAGE has a function to move the information recording medium M in the XY directions with respect to the lens LENS. If the lens LENS has a focusing function, a function to move the information recording medium M in the Z direction is not required. However, if the lens LENS has no focusing function, there may he provided in the holder HOLDER, a function (e.g., helicoid adjustment function) to move the information recording medium M in the Z direction separately from the stage STAGE.

A personal computer PC receives image data shot with the camera CAMERA and displays it on a monitor. If the two-dimensional barcode described in embodiment 3 is recorded in the information recording medium M, the personal computer PC may perform a process of decoding it. Specifically, the header portion described in embodiment 3 is acquired from the two-dimensional barcode, the code strings having the same digital data identifier in a specified sequence are combined, and decoding is performed. The processing procedure may be implemented on software or implemented as hardware such as circuit device.

In the case of simply Observing a grayscale image, it is possible to observe an image using the camera CAMERA having a liquid crystal display or project a captured image with a projector and observe the image. If software that decodes two-dimensional barcodes (software that implements the same function as software installed in the personal computer PC) is installed to the camera CAMERA, it is possible to decode digital data with the camera CAMERA alone and read information such as recorded images. In that case in particular, the personal computer PC is not required.

According to the present embodiment 8, it is useful for acquiring information such as image recorded in the information recording medium M by shooting, enlarging, and displaying it on a monitor, and showing it to a number of people at the same time by projecting it onto a wall using an image projection apparatus. Also, using the lens LENS with a high resolution and a high magnification makes it possible to shoot an enlarged photo of pixels and decode digital data therefrom if a two-dimensional barcode is recorded as in embodiment 3.

<Embodiment 8: Conclusion>

The image capturing device according to the present embodiment 8 incorporates the light LIGHT inside the camera mounting holder HOLDER. As a result, there is an advantage in that the image capturing device is not readily prone to external stay light. Also, the information recording medium M and the lens LENS are configured to be integral with the camera mounting holder HOLDER. As a result, there is an advantage in that shake does not occur frequently during shooting. One possible means of fastening the lens LENS to the camera mounting holder HOLDER, for example, is to fit the lens LENS into the tubular camera mounting holder HOLDER. However, the fastening means is not limited thereto.

In embodiment 7 and embodiment 8, the light LIGHT irradiates illumination light on the information recording medium M approximately from the lateral direction. However, if illumination light is at least irradiated diagonally at an angle with respect to the direction orthogonal to the information recording medium M (normal direction), it is possible to minimize, to a certain extent, problems such as decline in image contrast due to light reflected by the surface of the information recording medium M.

MODIFICATION EXAMPLES OF THE PRESENT INVENTION

The present invention is not limited to the embodiments described above and includes various modification examples. The above embodiments are described in detail for easy understanding of the present invention and are not necessarily limited to those having all the configuration described. Also, some of the configuration of a given embodiment can be replaced by the configuration of other embodiment. Also, the configuration of a given embodiment can be added with the configuration of other embodiment. Also, part of the configuration of each embodiment can be added, deleted, or replaced with other configuration.

In the above embodiments, the image grayscale is represented by a monochrome image. That is, the dot size is kept constant. In this case, the laser irradiation conditions for dot formation can be kept constant at least within the same layer. Therefore, there is an advantage in that quality management is easy. By providing several levels (e.g., three levels) for the dot size first and then combining it with error diffusion method as in embodiment 4, it is possible to represent more delicate grayscale. In that case, three levels for the threshold TH in FIG. 4 may be provided for three levels to create four-level bitmap data from white to black.

In the above embodiments, examples are described in which the dot portion is looked brighter than the surrounding region assuming that the information recording medium is observed under reflected light of an LED light source or a natural light. However, the present invention is not limited thereto. For example, it is a matter of course that the present invention is applicable when observation is conducted under transmitted light as when the dot portion looks darker than the surrounding region. It should be noted that it is needless to say that the white and black of the pattern to be marked are reversed for recording depending on whether reflected light or transmitted light is used, or that if a camera is used for shooting, a white and black reversal process is performed after shooting as necessary.

DESCRIPTION OF THE REFERENCE NUMERALS

M: Information recording medium
DOT: Dot
PIXEL: Pixel
DP: Dot pitch
LP: Dot pitch in the Z direction
LASER: Laser apparatus
BS: Beam splitter
SH1 to SH2: Shutters
OP1 to OP2: Optics
R: Loupe
BD1: Light-shielding plate SH: Legged holder
HOLDER: Camera mounting holder
STAGE: Stage

The invention claimed is:

1. An information recording medium that records information using an arrangement of a plurality of micro-denatured regions formed by irradiating an inside of a light-transmitting medium with a pulsed laser beam, wherein:
   the micro-denatured regions are formed in each of a first layer and a second layer inside the information recording medium,
   the micro-denatured regions are formed at a plurality of positions corresponding to a plurality of lattice points on a two-dimensional plane orthogonal to a thickness direction of the information recording medium in each of the first layer and the second layer,
   the micro-denatured regions formed in the first layer and the micro-denatured regions formed in the second layer are formed such that positions of the micro-denatured regions differ from each other when projected onto the two-dimensional plane, and
   the micro-denatured regions are formed such that all positions on the lattice points of the micro-denatured regions formed in the first layer do not overlap with any positions on the lattice points of the micro-denatured regions formed in the second layer.

2. The information recording medium of claim 1, wherein
   a plurality of the micro-denatured regions are formed in the first layer,
   the micro-denatured regions in the first layer are arranged in such a manner as not to overlap each other when projected onto the two-dimensional plane, and
   the micro-denatured regions in the first layer and the micro-denatured regions in the second layer are arranged in such a manner as not to overlap each other when projected onto the two-dimensional plane.

3. The information recording medium of claim 1, wherein
   a plurality of the micro-denatured regions are formed in each of the first layer and the second layer, and
   the micro-denatured regions formed in the first layer and the micro-denatured regions formed in the second layer are arranged in such a manner as to form the same arrangement pattern as each other when projected onto the two-dimensional plane.

4. The information recording medium of claim 1, wherein
   a plurality of the micro-denatured regions are formed in each of the first layer and the second layer,
   the micro-denatured regions formed in the first layer are arranged in such a manner as to form a first arrangement pattern when projected onto the two-dimensional plane, and
   the micro-denatured regions formed in the second layer are arranged in such a manner as to form a second arrangement pattern different from the first arrangement pattern when projected onto the two-dimensional plane.

5. The information recording medium of claim 1, wherein the micro-denatured regions are arranged in such a manner as to form an image having a plurality of pixels when projected onto the two-dimensional plane.

6. The information recording medium of claim 5, wherein the micro-denatured regions are arranged in such a manner as to form a two-dimensional barcode inside the pixel when projected onto the two-dimensional plane.

7. The information recording medium of claim 1, wherein the micro-denatured regions are arranged in such a manner as to form a two-dimensional barcode when projected onto the two-dimensional plane.

8. The information recording medium of claim 7, wherein
   the micro-denatured regions are arranged in such a manner as to form a plurality of the two-dimensional barcodes, and
   each of the two-dimensional barcodes describes part of a code string generated by encoding electronic data with a character string and describes an identifier of the electronic data used to decode the code string described by each of the two-dimensional barcodes into the electronic data.

9. The information recording medium of claim 1, wherein the micro-denatured regions are void holes formed inside the information recording medium.

10. An information recording method that records information using an arrangement of a plurality of micro-denatured regions formed by irradiating an inside of a light-transmitting medium with a pulsed laser beam, the information recording method comprising:
    a recording step of forming the micro-denatured regions in each of a first layer and a second layer inside the information recording medium, wherein
    in the recording step, the micro-denatured regions are formed at a plurality of positions corresponding to a plurality of lattice points on a two-dimensional plane orthogonal to a thickness direction of the information recording medium in each of the first layer and the second layer,
    in the recording step, the micro-denatured regions formed in the first layer and the micro-denatured regions formed in the second layer are formed such that positions of the micro-denatured regions differ from each other when projected onto the two-dimensional plane, and
    in the recording step, the micro-denatured regions are formed such that all positions on the lattice points of the micro-denatured regions formed in the first layer do not overlap with any positions on the lattice points of the micro-denatured regions formed in the second layer.

11. The information recording method of claim 10, wherein
    in the recording step, the micro-denatured regions are formed in the first layer, and at the same time, the micro-denatured regions are formed in the second layer.

12. The information recording method of claim 10 further comprising:
    an image acquisition step of acquiring image data including a plurality of pixels having one of two-level luminance values, wherein
    in the recording step, the micro-denatured regions are formed at positions corresponding to the pixels having a higher value of the two-level luminance values on the two-dimensional plane.

13. The information recording method of claim 12 further comprising:
    a step of acquiring a depth of field of an image capturing device adapted to capture the pixels recorded in the information recording medium, wherein
    in the recording step, the micro-denatured regions are formed at a depth within the depth of field from a surface of the information recording medium.

14. An information reproduction method that reproduces information recorded in an information recording medium that records the information using an arrangement of a plurality of micro-denatured regions formed by irradiating an inside of a light-transmitting medium with a pulsed laser beam, wherein
- the micro-denatured regions are formed in each of a first layer and a second layer inside the information recording medium,
- the micro-denatured regions are formed at a plurality of positions corresponding to a plurality of lattice points on a two-dimensional plane orthogonal to a thickness direction of the information recording medium in each of the first layer and the second layer,
- the micro-denatured regions are formed such that all positions on the lattice points of the micro-denatured regions formed in the first layer do not overlap with any positions on the lattice points of the micro-denatured regions formed in the second layer, and
- the information reproduction method comprises:
  - a step of irradiating illumination light onto the information recording medium from a direction not orthogonal to the first layer and the second layer;
  - a step of capturing the information recording medium irradiated with the illumination light with an image capturing device; and
  - a step of reproducing the information from an image captured with the image capturing device.

15. The information reproduction method of claim 14, wherein
- the micro-denatured regions are arranged in such a manner as to form a plurality of two-dimensional barcodes when projected onto the two-dimensional plane, and
- each of the two-dimensional barcodes describes part of a code string generated by encoding electronic data with a character string and describes an identifier of the electronic data used to decode the code string described by each of the two-dimensional barcodes into the electronic data, the information reproduction method further comprising:
- a step of reproducing the electronic data by acquiring the code string from each of the one or more two-dimensional barcodes that describe the same identifier and combining the code strings.

* * * * *